Oct. 17, 1944.   R. PASH   2,360,618
ELECTRICAL TESTING DEVICE
Filed Dec. 3, 1942
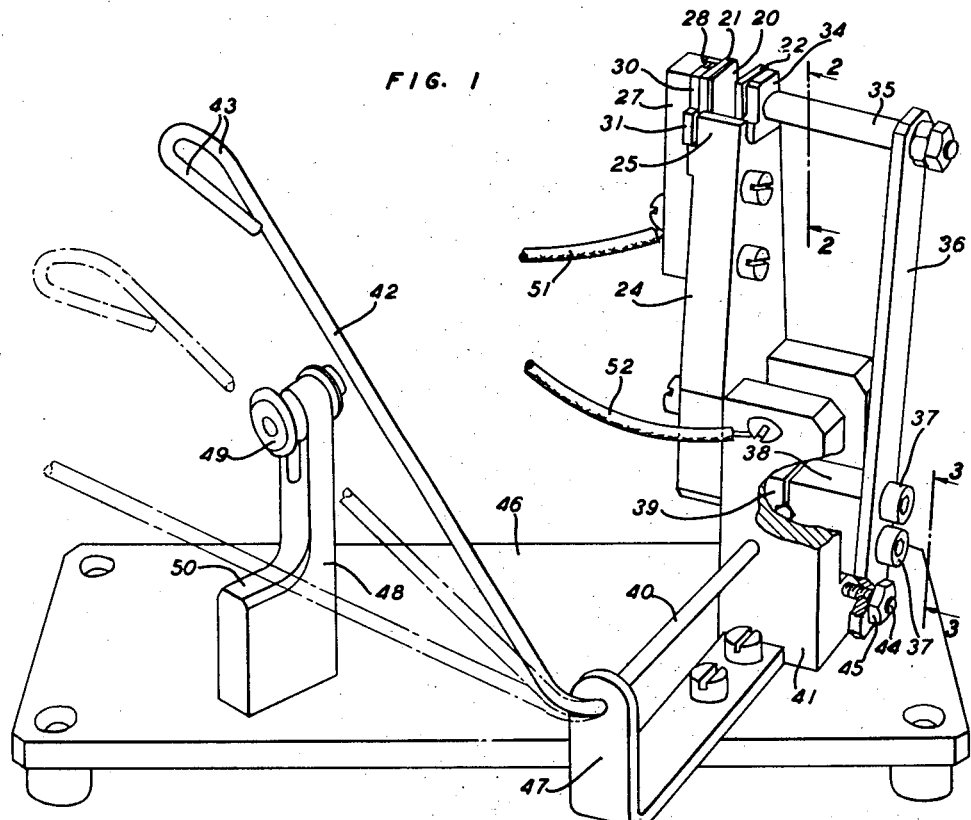
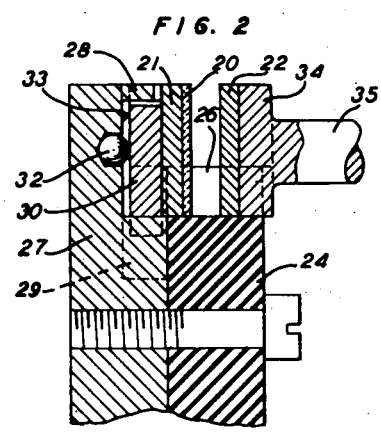
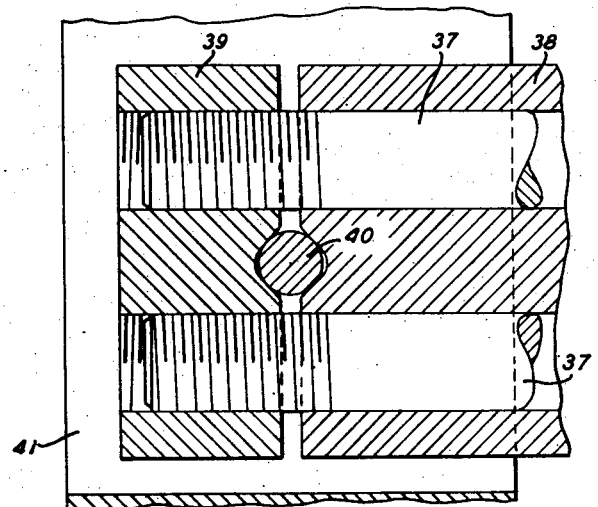
INVENTOR
R. PASH
BY
E. R. Nowlan
ATTORNEY Patented Oct. 17, 1944

2,360,618

UNITED STATES PATENT OFFICE 2,360,618

ELECTRICAL TESTING DEVICE

Robert Pash, Roselle, N. J., assignor to Western Electric Company, Incorporated, New York, N. Y., a corporation of New York Application December 3, 1942, Serial No. 467,745

10 Claims. (Cl. 175—183)

This invention relates to an electrical testing device, and more particularly to a device for subjecting an electrical assembly such as an assembly of metal and quartz plates, a condenser stack, or the like to predetermined minimum and maximum mechanical pressures while electrical potentials are applied thereto for testing purposes.

In a number of different kinds of electrical apparatus, especially as employed in the communications arts, use is made in various ways of the combination of a precisely dimensioned slab, slice or plate cut from crystalline quartz, with a pair of metal plates, one on each side of the quartz, these three elements being held together by spring pressure. It is desirable that electrical and electro-mechanical properties of such metal-quartz-metal plate triplets be tested and measured, prior to assembling them in their final locations, under pressures of the same intensity as those under which they are normally to be used, and also under greater pressures than the normal to determine the nature of their pressure gradients of the critical properties.

An object of the present invention is to provide a simple, durable and reliable apparatus for clamping together elements to be tested under predetermined mechanical pressure while at the same time making electrical connections to the elements suitable for applying test potentials thereto.

With the above and other objects in view, one embodiment may include a rigid, insulated, metallic contact abutment to be apposed to one side of an assembly to be tested, a movable metallic contact abutment to be apposed to the opposite side of the assembly, and means to press the movable abutment resiliently toward the fixed abutment, the said means comprising a pressure member acting on the movable abutment and mounted adjustably by means of V-block clamp members on a transverse shaft of resilient material, a part of the shaft being bent at right angles to the rest thereof to form an integral operating lever, and means to stop motion of the lever in a predetermined position thereof.

Other objects and features of the invention will appear from the following detailed description of one embodiment thereof taken in connection with the accompanying drawing in which the same reference numerals are applied to identical parts in the several figures, and in which Fig. 1 is a view in perspective of an apparatus constructed in accordance with the invention;

Fig. 2 is an enlarged section on the line 2—2 of Fig. 1; and

Fig. 3 is an enlarged section on the line 3—3 of Fig. 1.

As herein disclosed, the invention is embodied in a device whose purpose is to exert pressure of two different, predetermined intensities upon an assembly of a plate 20 of quartz with plates 21 and 22 of metal on either side thereof, and at the same time to make electrical connections to the plates 21 and 22 individually so that test potentials may be applied thereto. The crystal assembly 21, 20, 22 is supported, standing on edge, on the horizontal upper end of a post-like member 24 of insulating material, e. g. Bakelite, ebonite, hard fiber, or the like. The top of the post 24 is formed with a transverse, flat-bottomed groove just wide enough to receive the plates 21, 20, 22 easily between side walls 25 and 26. A metal back member 27 secured to the post 24 closes the left end of the groove. At the top of its right face is formed a rightwardly projecting nose 28, and directly below this is a similarly narrowed, rightwardly projecting upstanding nose 29. A flat slab-like member 30 is bifurcated to fit loosely at top and bottom over the noses 28 and 29 and is formed with lateral projections 31 (and one not visible) to abut against the left ends of the walls 25 and 26. The members 27 and 30 are both of metal.

A metal ball 32 is housed for about three-quarters of its thickness in the member 27, extending out therefrom to abut against the member 30 about in line with the centers of the plates 21, 20 and 22. The member 30 is formed to have a loose fit in the recess 33 of the member 27 as well as over the noses 28 and 29, and being thus balanced on the ball 32 against pressure to the right will set itself wherever required by the plates 21, 20 and 22. At the other end of the groove between the walls 25 and 26, is a slab-like pressure member 34, easily slidable in the groove and rigid on or integral with a horizontal shaft or push rod 35 extending out to the right and connected loosely at its outer end to an upstanding lever 36. The lever 36 is rigidly connected near its lower end, by screws 37, 37 to the right hand one of a pair of V-clamp blocks 38 and 39, clamped together by the same screws 37, 37 on a horizontal shaft 40 journalled in a bifurcately upstanding pedestal 41 of metal on which the post 24 is mounted. The V-clamp 38, 39 is free to rotate with the shaft 40 between the parts of the fork of the pedestal 41. The outer, near end of the shaft 40 is bent at right angles to the left and upward to form a torsion lever 42 with a handle 43. A stop screw 44, with a lock nut 45, is mounted in the bottom end of the lever 36 to abut against the pedestal 41 and thus prevent the pressure member 34 from being drawn out of the groove at the top of the post 24.

The pedestal 41 is rigidly mounted on a flat main base 46. The shaft 40 is hard and elastic, e. g., piano wire, and extends forwardly from the pedestal 41 for some distance and is then supported in a third journal member 47 mounted on the base 46. Another pedestal 48 on the base 46 carries a vertically adjustable catch button or latch 49 and is also formed with an upwardly facing stop shoulder 50, both to coact with the lever arm 42.

In operation a triplet 21, 20, 22 to be tested is placed in position, as shown, between the members 30 and 34. The lever 42 ordinarily stands in the position shown in full lines. By forcing the lever down and catching it under the latch 49, the shaft 40 is rotated counter-clockwise. This swings the V-clamp 39, 38, the lever 36 to urge the push rod 35 to press the member 34 to the left and thus squeeze the triplet against the stationary member 30. The member 30 accommodates itself on the ball 32 to whatever lack of parallelism may exist among the faces of the triplet thus pressed together, so that the pressure is distributed evenly over the triplet. The various parts involved are so proportioned and related that a slight movement of the lever 42 downward from its normal, free position will close the parts, 34, 22, 20, 21 and 30 into mutual contact, and further motion of the lever 42 down to be caught under the latch 49 will exert an increasing pressure on the parts in the groove at the top of the post 24 up to a pressure equal to the pressure to be normally exerted on the triplet in subsequent use. This pressure is chiefly exerted through the torsional resilience of the shaft 40.

Testing potential or current may then be applied to the compressed triplet by way of electrical leads 51 and 52 connected respectively to the members 27 and 41. While the test is being made, if desired, the pressure may be increased to a predetermined maximum value by forcing the lever 42 down against the stop shoulder 50.

The pressure exerted between the approximable pressure members 30 and 34, when the lever 42 is caught under the latch 49, can be set to any desired value within a considerable range by adjusting the angular position of the lever 42, when free, with respect to the lever 36 by changing the position of the shaft 40 in the V-blocks 38 and 39. The ratio of the pressures exerted when the lever is first in one and then in the other of the two positions shown in dotted lines in Fig. 1, can also be adjusted through a considerable range by adjusting the latch 49 up or down in the pedestal 48. At the same time the pressure exerted on a triplet 21, 20, 22 between the pressure members 30 and 34 is distributed uniformly over the triplet because of the one point support afforded to the member 30 by the ball 32.

The embodiment above disclosed and described is illustrative and may be variously modified and departed from within the spirit and scope of the invention as particularly pointed out and described in the appended claims.

What is claimed is:

1. In an electrical testing apparatus, a pair of approximable pressure members to receive a device to be tested therebetween, a torsionally elastic shaft, a member secured to the shaft and abutted against one of the pressure members, and means to exert torque on the shaft to urge the said one of the pressure members toward the other pressure member.

2. In an electrical testing apparatus, a pair of approximable pressure members to receive a device to be tested therebetween, a torsionally elastic shaft, a member adjustably secured to the shaft and abutted against one of the pressure members, and means to exert torque on the shaft to urge the said one of the pressure members toward the other pressure member.

3. In an electrical testing apparatus, a pair of approximable pressure members to receive a device to be tested therebetween, a torsionally elastic shaft, clamp means adjustably secured on the shaft, a lever member secured to the clamp means and abutted against one of the pressure members, and a lever on the shaft to exert torque thereon to cause the lever member to urge the said one of the pressure members toward the other pressure member.

4. In an electrical testing apparatus, a pair of approximable pressure members to receive a device to be tested therebetween, a torsionally elastic shaft, a pair of V-clamp blocks adjustably secured on the shaft, a lever member secured to one of the V-clamp blocks and abutted against one of the pressure members, and a lever on the shaft to exert torque thereon to cause the lever member to urge the said one of the pressure members toward the other pressure member.

5. In an electrical testing apparatus, a pair of approximable pressure members to receive a device to be tested therebetween, a torsionally elastic shaft, clamp means adjustably secured on the shaft, a lever member secured to the clamp means and abutted against one of the pressure members, and a lever on the shaft to exert torque thereon to cause the lever member to urge the said one of the pressure members toward the other pressure member, in combination with latch means to hold the lever member in a predetermined position and thereby to cause a predetermined pressure to be exerted on a device between the two pressure members.

6. In an electrical testing apparatus, a pair of approximable pressure members to receive a device to be tested therebetween, a torsionally elastic shaft, a pair of V-clamp blocks adjustably secured on the shaft, a lever member secured to one of the V-clamp blocks and abutted against one of the pressure members, and a lever on the shaft to exert torque thereon to cause the lever member to urge the said one of the pressure members toward the other pressure member, in combination with latch means to hold the lever member in a predetermined position and thereby to cause a predetermined pressure to be exerted on a device between the two pressure members.

7. In an electrical testing apparatus, a pair of approximable pressure members to receive a device to be tested therebetween, a torsionally elastic shaft, clamp means adjustably secured on the shaft, a lever member secured to the clamp means and abutted against one of the pressure members, and a lever on the shaft to exert torque thereon to cause the lever member to urge the said one of the pressure members toward the other pressure member, in combination with one point support means for the said other pressure member to thereby cause pressure upon a device between the two pressure members to be uniformly distributed over the device.

8. In an electrical testing apparatus, a pair of approximable pressure members to receive a device to be tested therebetween, a torsionally elastic shaft, a pair of V-clamp blocks adjustably secured on the shaft, a lever member secured to one of the V-clamp blocks and abutted against one of the pressure members, and a lever on the shaft to exert torque thereon to cause the lever member to urge the said one of the pressure members toward the other pressure members, in combination with one point support means for the said other pressure member to thereby cause pressure upon a device between the two pressure members to be uniformly distributed over the device.

9. In an electrical testing apparatus, a pair of approximable pressure members to receive a device to be tested therebetween, a torsionally elastic shaft, clamp means adjustably secured on the shaft, a lever member secured to the clamp means and abutted against one of the pressure members, and a lever on the shaft to exert torque thereon to cause the lever member to urge the said one of the pressure members toward the other pressure member, in combination with one point support means for the said other member and latch means to hold the lever member in a predetermined position and thereby to cause a predetermined pressure to be exerted uniformly on a device between the two pressure members.

10. In an electrical testing apparatus, a pair of approximable pressure members to receive a device to be tested therebetween, a torsionally elastic shaft, a pair of V-clamp blocks adjustably secured on the shaft, a lever member secured to one of the V-clamp blocks and abutted against one of the pressure members, and a lever on the shaft to exert torque thereon to cause the lever member to urge the said one of the pressure members toward the other pressure member, in combination with one point support means for the said other member and latch means to hold the lever member in a predetermined position and thereby to cause a predetermined pressure to be exerted uniformly on a device between the two pressure members.

ROBERT PASH.